United States Patent
Booij et al.

(10) Patent No.: US 12,211,088 B2
(45) Date of Patent: Jan. 28, 2025

(54) METHOD AND SYSTEM FOR AUTOMATED PRODUCT LOCALIZATION THROUGH MOBILE DATA ANALYSIS

(71) Applicant: Sonitor Technologies AS, Oslo (NO)

(72) Inventors: Wilfred Edwin Booij, Oslo (NO); Magnus Oplenskedal, Oslo (NO)

(73) Assignee: Sonitor Technologies AS, Oslo (NO)

( * ) Notice: Subject to any disclaimer, the term of this patent is extended or adjusted under 35 U.S.C. 154(b) by 0 days.

(21) Appl. No.: 16/806,447

(22) Filed: Mar. 2, 2020

(65) Prior Publication Data

US 2020/0279318 A1 Sep. 3, 2020

Related U.S. Application Data

(60) Provisional application No. 62/812,433, filed on Mar. 1, 2019.

(51) Int. Cl.
*G06Q 30/0601* (2023.01)
*H04W 4/021* (2018.01)

(52) U.S. Cl.
CPC ........ *G06Q 30/0639* (2013.01); *H04W 4/021* (2013.01)

(58) Field of Classification Search
USPC ............................................. 705/26.1–27.2
See application file for complete search history.

(56) References Cited

U.S. PATENT DOCUMENTS

| | | | |
|---|---|---|---|
| 6,123,259 A | 9/2000 | Ogasawara | |
| 7,010,498 B1 | 3/2006 | Berstis | |
| 11,126,861 B1 * | 9/2021 | Evans | H04N 23/74 |
| 2006/0200378 A1 * | 9/2006 | Sorensen | G06Q 30/0203 |
| | | | 705/7.29 |

(Continued)

FOREIGN PATENT DOCUMENTS

| | | |
|---|---|---|
| CN | 105981426 A | 9/2016 |
| CN | 108431851 A | 8/2018 |

OTHER PUBLICATIONS

This shopper assistant app shows the exact location a product is kept in a store. (Oct. 30, 2019). M2 Presswire Retrieved from https://dialog.proquest.com/professional/docview/2310481940?accountid=131444 (Year: 2019).*

(Continued)

*Primary Examiner* — Jeffrey A. Smith
*Assistant Examiner* — Ashley D Preston
(74) *Attorney, Agent, or Firm* — Sterne, Kessler, Goldstein & Fox P.L.L.C.

(57) ABSTRACT

An approach for product localization is described that includes detecting one or more movement activities of a user in an indoor environment, and determining a respective position for each of the one or more movement activities using a sensor associated with the user. The approach further includes identifying one or more stoppage locations from the detected one or more movement activities, and receiving a list of one or more purchased items purchased by the user in the indoor environment. Finally, the approach further includes correlating at least one of the more purchased items with at least one of the one or more stoppage locations, and predicting the location of the one or more purchased items based on the correlating.

18 Claims, 8 Drawing Sheets

(56) References Cited

U.S. PATENT DOCUMENTS

| | | | |
|---|---|---|---|
| 2008/0004796 A1* | 1/2008 | Schott | G01C 21/005 |
| | | | 701/434 |
| 2015/0169597 A1 | 6/2015 | Edge et al. | |
| 2015/0262197 A1* | 9/2015 | Chao | G06Q 30/0201 |
| | | | 705/7.34 |
| 2016/0313790 A1* | 10/2016 | Clement | G02B 27/0093 |
| 2017/0186077 A1 | 6/2017 | Srinivasan et al. | |
| 2018/0012267 A1* | 1/2018 | Bordewieck | G06Q 10/087 |
| 2020/0074125 A1* | 3/2020 | Rein | G06K 7/0008 |
| 2020/0273013 A1* | 8/2020 | Garner | G06K 9/00671 |

OTHER PUBLICATIONS

International Search Report, mailed Jul. 17, 2020 for Appl. No. PCT/IB2020/051762, 4 pages.
Written Opinion, mailed Jul. 17, 2020 for Appl. No. PCT/IB2020/051762, 7 pages.
Deak, Gabriel et al., "A survey of active and passive indoor localization systems," Computer Communications, vol. 35, No. 16, Jun. 26, 2012, pp. 1939-1954 XPO28938403, ISSN: 0140-3664, DOI: 10.106/J.COMCOM.2012.06.004.

* cited by examiner

200

| $c_1$ | $p_1$ | $p_2$ | $p_3$ | $p_4$ |
|---|---|---|---|---|
| $i_1$ | 0 | 1 | 1 | 0 |
| $i_2$ | 0 | 1 | 1 | 0 |
| $i_3$ | 0 | 1 | 1 | 0 |
| $i_4$ | 0 | 0 | 0 | 0 |

| $c_2$ | $p_1$ | $p_2$ | $p_3$ | $p_4$ |
|---|---|---|---|---|
| $i_1$ | 0 | 1 | 0 | 0 |
| $i_2$ | 0 | 0 | 0 | 0 |
| $i_3$ | 0 | 0 | 0 | 0 |
| $i_4$ | 0 | 0 | 0 | 0 |

| $c_3$ | $p_1$ | $p_2$ | $p_3$ | $p_4$ |
|---|---|---|---|---|
| $i_1$ | 1 | 1 | 0 | 1 |
| $i_2$ | 1 | 1 | 0 | 1 |
| $i_3$ | 0 | 0 | 0 | 1 |
| $i_4$ | 1 | 1 | 0 | 1 |

FIG. 2

$$DS = \begin{pmatrix} 2 & 3 & 1 & 1 \\ 2 & 2 & 1 & 1 \\ 1 & 1 & 1 & 0 \\ 1 & 1 & 0 & 1 \end{pmatrix}$$

$$\alpha_c = \begin{cases} 0.750 & \text{if } 5 < |S_c| \leq 10 \wedge \frac{|I_c|}{|S_c|} \geq 0.5 \\ 0.650 & \text{if } |S_c| \leq 5 \wedge \frac{|I_c|}{|S_c|} \geq 0.5 \\ 0.985 & \text{else} \end{cases}$$

|   | $DS^{uni}$ | | | |
|---|---|---|---|---|
|   | $p_1$ | $p_2$ | $p_3$ | $p_4$ |
| $l_1$ | 0.37 | 1.00 | 0.14 | 0.14 |
| $l_2$ | 0.37 | 0.37 | 0.14 | 0.14 |
| $l_3$ | 0.14 | 0.14 | 0.14 | 0.05 |
| $l_4$ | 0.14 | 0.14 | 0.05 | 0.14 |

|   | $DS^{uni}$ | | | |
|---|---|---|---|---|
|   | $p_1$ | $p_2$ | $p_3$ | $p_4$ |
| $l_1$ | 0.22 | 0.61 | 0.08 | 0.08 |
| $l_2$ | 0.37 | 0.37 | 0.13 | 0.13 |
| $l_3$ | 0.30 | 0.30 | 0.30 | 0.11 |
| $l_4$ | 0.30 | 0.30 | 0.11 | 0.30 |

|   | $DS^{uni}$ | | | |
|---|---|---|---|---|
|   | $p_1$ | $p_2$ | $p_3$ | $p_4$ |
| $l_1$ | 0.18 | 0.39 | 0.13 | 0.13 |
| $l_2$ | 0.31 | 0.23 | 0.21 | 0.21 |
| $l_3$ | 0.25 | 0.19 | 0.46 | 0.18 |
| $l_4$ | 0.25 | 0.19 | 0.18 | 0.46 |

FIG. 5

METHOD AND SYSTEM FOR AUTOMATED PRODUCT LOCALIZATION THROUGH MOBILE DATA ANALYSIS

CROSS-REFERENCE TO RELATED APPLICATIONS

This application claims priority to U.S. Provisional Application No. 62/812,433, filed on Mar. 1, 2019, which is hereby incorporated by reference in its entirety.

FIELD

The present disclosure relates generally to real-time locating systems and more particularly to real-time locating systems for use in product localization systems.

BACKGROUND

Recent developments in the field of indoor Real-Time Locating Systems (RTLS) using mobile devices stimulate decision support for users. For instance, smartphone-based navigation in shops can enable location-aware recommendations of certain products to customers. An impeding factor to realize such systems is that they need the exact position of products. However, existing product localization solutions are based on tagging or manual location registering which tend to be quite costly and laborious. A solution is proposed to this problem in the form of an automated product localization approach. Our system infers the location of products based on the results of accumulating two sets of customer data, i.e., the locations at which the customers stop for picking up items as well as list of the items, they purchase. These two data sets are accumulated for a large number of users, making it possible to build correct mappings between the products and their positions.

SUMMARY

In an embodiment of the present disclosure, a method for product localization is described that includes detecting locations in which the user stops for a certain time period and receiving a list of one or more items purchased by the user in the indoor environment. Finally, the method includes correlating at least one or more of the purchased items with at least one or more of the stoppage locations, and predicting the location of one or more purchased items based on the correlating.

In a further embodiment of the present disclosure, a computer-implemented product localization system is disclosed that includes at least one processor configured to execute steps that includes identifying one or more stoppage locations, and receiving a list of one or more purchased items purchased by the user in the indoor environment. Finally, the method includes correlating at least one of the more purchased items with at least one of the one or more stoppage locations, and predicting the location of the one or more purchased items based on the correlating.

BRIEF DESCRIPTION OF THE DRAWINGS

The accompanying drawings, which are incorporated herein and form a part of the specification, illustrate embodiments of the present disclosure and, together with the description, further explain the principles of the disclosure and enable a person skilled in the pertinent arts to make and use the embodiments.

FIG. 2 illustrates exemplary data in matrices for three simulated customers, c1, c2 and c3, according to example embodiments of the present disclosure.

FIG. 3 illustrates exemplary data in matrix DS after summing the three matrices c1, c2 and c3 through simple matrix addition, according to example embodiments of the present disclosure.

FIG. 4 illustrates $\alpha_c$ values providing good results, according to example aspects of the present disclosure.

FIG. 5 illustrate exemplary data in while performing the 3 steps of softmax-based inference on the matrix DS, according to example aspects of the present disclosure.

Figure 1:
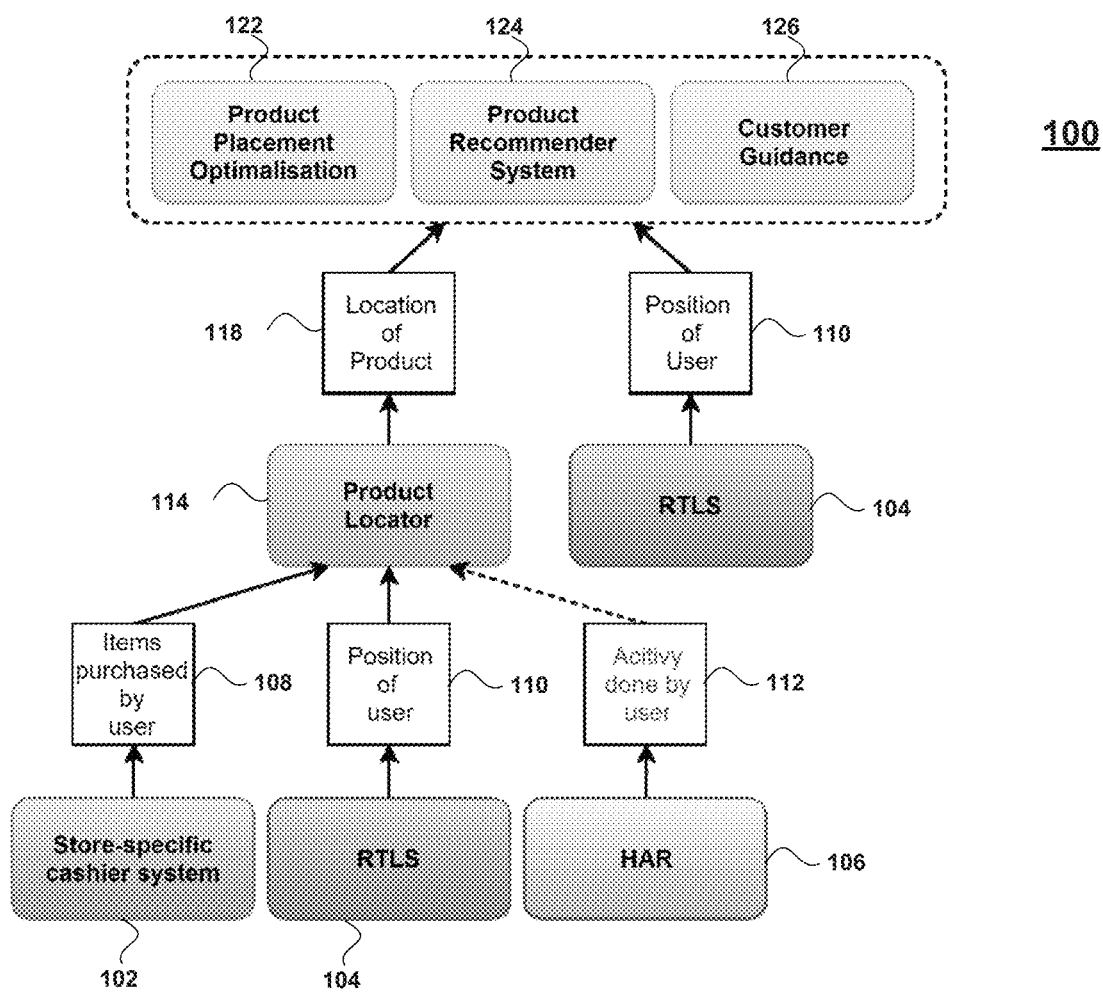
FIG. 1 illustrates an example product locator system, according to example aspects of the present disclosure.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION

The present disclosure will be described with reference to the accompanying drawings. In the drawings, like reference numbers indicate identical or functionally similar elements. Additionally, the left-most digit of a reference number identifies the drawing in which the reference number first appears.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment does not necessarily include the particular feature, structure, or characteristic. Moreover, such phrases do not necessarily refer to the same exemplary embodiment. Further, when the disclosure describes a particular feature, structure, or characteristic in connection with an exemplary embodiment, those skilled in the relevant arts will know how to affect such feature, structure, or characteristic in connection with other exemplary embodiments, whether or not explicitly described.

The exemplary embodiments described herein provide illustrative examples and are not limiting. Other exemplary embodiments are possible, and modifications may be made to the exemplary embodiments within the spirit and scope of the disclosure. Therefore, the Detailed Description does not limit the disclosure. Rather, only the below claims and their equivalents define the scope of the disclosure.

Hardware (e.g., circuits), firmware, software, or any combination thereof may be used to achieve the embodiments. Embodiments may also be implemented as instructions stored on a machine-readable medium and read and executed by one or more processors. A machine-readable medium includes any mechanism for storing or transmitting information in a form readable by a machine (e.g., a computing device). For example, in some embodiments a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that the actions result from computing devices, processors, controllers, or other devices executing the firmware, software, routines, and/or instructions.

Any reference to the term "module" shall be understood to include at least one of software, firmware, and hardware (such as one or more circuit, microchip, or device, or any combination thereof), and any combination thereof. In addition, those skilled in relevant arts will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will fully reveal the general nature of the disclosure so that others can, by applying knowledge of those skilled in relevant arts, readily modify and/or customize for various applications such exemplary embodiments, without undue experimentation and without departing from the spirit and scope of the disclosure. Therefore, such modifications fall within the meaning and plurality of equivalents of the exemplary embodiments based upon the teaching and guidance presented herein. Here, the phraseology or terminology serves the purpose of description, not limitation, such that the terminology or phraseology of the present specification should be interpreted by those skilled in relevant arts in light of the teachings herein.

Recent developments in the field of indoor real-time locating systems (RTLS) using mobile devices stimulate decision support for users. For instance, smartphone-based navigation in shops can enable location-aware recommendations of certain products to customers. An impeding factor to realize such systems is that they need the exact position of products. However, existing product localization solutions are based on tagging or manual location registering which tend to be quite costly and laborious. A solution to this problem is proposed in the form of an automated product localization approach. Our system infers the location of products based on the results of accumulating two sets of customer data, i.e., the locations at which the customers stop for picking up items as well as list of the items, they purchase. These two data sets are accumulated for a large number of users, making it possible to build correct mappings between the products and their positions. A basic version of the localization algorithm and two extensions is introduced. One helps to improve calculating the position of relocated products while the other one fosters a faster localization using a smaller number of user data sets. Results of various simulation runs are discussed, which give evidence that our system has a good potential to work in practice.

In recent years, the rapid development of mobile technology has provided unprecedented opportunities to realize intelligent environments. In particular, the wide presence of smartphones in our daily life with their powerful sensors and processing capabilities creates new opportunities to support the users with context-aware systems. These types of applications use information gathered from the users' environments to support their decision making process in various fields, such as mobile recommendations. A mobile recommender system (MRS) analyzes information retrieved from the environment in which a user is moving through, and uses the analysis results to provide meaningful suggestions. The recommendations can be made based on the information collected from the surrounding context and user behavior.

A key element of context information for an MRS is the real-time position of the user, which is basically the current location of her/his smartphone. For context-aware outdoor systems, global navigation satellite systems like GPS provide this information, e.g., the pathfinding algorithm of Google maps, however, the development of indoor MRS was hampered until recently due to the lack of accurate smartphone-based indoor positioning technologies. New indoor Real-Time Locating Systems (RTLS) are being developed that are able to detect the exact location of a user's smartphone within a few centimeters. For instance, the ultrasound-based Forkbeard™ technology is a recent RTLS solution promising to locate a smartphone with a precision of less than 10 cm.

A typical MRS application using an indoor RTLS is navigation support in shops to recommend certain products to customers. Similar to the navigation systems in vehicles, customers are provided with a path that guides them to the places where desired goods are stored. The realization of such a system, however, requires the accurate position of products, while in many shops this type of information is not available yet. To obtain the position of products, two basic solutions seem feasible. One solution is to attach special tags to the products in a store and use them to let the RTLS track their exact positions. The provision of the products with such computer readable tags, however, is a major cost factor. The other solution is to register and update the position of the products manually. However, this needs a lot of human effort, in particular if products are regularly relocated which is the case in many grocery stores. Considering indoor localization, existing work is mostly focused on coarse-grained indoor navigation in stores, e.g., to guide the customer by means of different sensor types on the user's smartphone and basic localization technologies (e.g., signal strength measured at various places).

In this disclosure, embodiments provide a cost-efficient approach to automatically locate products in retail stores. Instead of tagging products or registering their positions manually, product localization, in our approach, is performed using two sets of customer data: the set of positions at which the customer stops while shopping, and the list of items purchased by her/him. In this approach, these data pairs are accumulated over a large number of customers. Since the customers can purchase products only by passing through the location of products, the accumulation reveals distinct correlations between items and places at which their buyers stop. These correlations are utilized to infer the positions of the goods. Some embodiments use a basic customer score accumulation algorithm to accumulate customer data and to infer product locations out of the accumulation results. Further, certain embodiments introduce two extensions of the algorithm (i.e., leaky customer score accumulation and Softmax-based inference) to improve position calculation for relocated products and to reduce the number of customers needed to infer the location of products, respectively.

Considering a significant number of errors in the customer data sets, e.g., stopping at places without picking up items, simulation-based evaluation results show that 99.9% of the 8,000 products in a typical large grocery store can be correctly located after aggregating the data of around 12,000 customers. Assuming 1,000 customers a day, the algorithm needs to run about 12 days to calculate the location of items, which seems practically feasible.

The scope of certain embodiments is shown in FIG. 1. Intelligent location aware systems, such as mobile recommender systems 124, product placement optimization 122, and customer guidance 126, rely on the current position 110 of users that can be obtained using an RTLS 104. As mentioned above, MRS also needs the location of the offered products 118 which can be retrieved with a product locator 114. For a large number of users, the product locator 114 collects data sets consisting of the places at which the customers stop while passing through the store as well as the list of items, they purchase. The customer stops are deduced from the RTLS data, while the list of purchased items 108 can be obtained from the cashier systems or special applications provided by the stores. In an example, a human activity recognition (HAR) system 106 can determine the user activity 112. In addition, the activities done by the user 112 during shopping can be a useful source of information for the product locator 114. Cashier system 102 (which may be a store-specific cashier system) provides the items 108 purchased by a user. In the rest of this section, three sources of customer data and their relevance are described.

For the proposed system to work the components described in the following three sections needs to be realized:

User Activity Recognition

An accurate human activity classifying algorithm is needed to infer the activity of a user. Examples of human activities inferred by the classifier is, but not limited to, one or more of the following activities: moving, stopping, running, picking up item, falling, walking up stairs, walking down stairs, searching. The human activity classifier can be, but is not limited to, one or more of the following classifying algorithms: decision tree, random forest, support vector machine, naive Bayes, hidden Markov models, deep fully connected neural network, convolutional neural network, auto-encoders and stacked auto-encoders, restricted Boltzmann machine, deep belief network, recurrent neural network or hybrid models such as combinations of CNN (convolutional neural networks) and RNN (recurrent neural networks).

These classifiers use the output from sensors from one or more sensor modality aspects such as body-worn sensors, object sensors and ambient sensors.

One or more of the following body-worn devices will be used to provide the sensor-data needed by the activity classifier: smartphones, tablets, wristbands, laptops, watches, glasses and/or any type of smart clothing. The sensors that will be used are one or more of the following: accelerometer, gyroscope, magnetometer, heartbeat monitor, heat-sensor, microphone, GPS, camera.

Interpreting sensor inputs of mobile phones to find out certain activities is of growing importance, e.g., in health care. This may be done by human activity recognition (HAR) systems that use pattern recognition algorithms to classify human activities from sensor data. In some embodiments, HAR classifiers with an accuracy of greater than 90% may be provided.

The development of HAR systems, however, tends to be complex. In certain embodiments, the objective is to detect if a product is picked up or not from the movements sensed by the customer's smartphone. Yet, to allow an HAR system to learn the relation between sensor data and this activity, one needs example data sets for the activity "item pickup". In an embodiment, a straightforward approach to recognizing the picking up of items in a shop is to record stops of customers—this is easily feasible using an RTLS. In particular, a stop activity may be classified as "staying within a small area for a certain amount of time," e.g., staying in an area of one meter diameter for at least three seconds. Since customers perform those stops when they pick up products to buy, this classifier is a simple alternative to more complex activity recognitions.

The price for the simplicity to just register stops instead of using more complex HAR mechanisms is a potentially larger number of errors in the customer data sets. For example, customers can also stop at places at which they only look at certain products but decide not to buy them, or simply conduct other activities like checking their phones. Moreover, they may pick up products without stopping such that the location of a product pickup is not registered by the RTLS. The simulations carried out, however, revealed that the above straightforward algorithm is sufficiently robust against these errors. The only effect is that the number of customers needed to locate all products correctly is slightly growing but, the errors do not lead to false localizations.

User Position Detection

In addition to classifying the user's activities, embodiments of the present approach use accurate positional data of a user while the user moves through the indoor environment to plot the position of the user's activities, and most importantly the position where the user stops and picks up items.

To be able to distinguish between different product storage compartments, e.g., aisles, freezers, etc. where a user might have picked up a product, the positioning technology must be able to provide highly accurate position of the device carried/worn by the user. One or more of the following real-time-location technologies will be used to provide high accuracy, real time location of devices: Satellite geolocation systems, telecommunication systems for mobile devices, visible light communications (VLC), RFID, ultrasound, WiFi, Bluetooth, ultra-wideband (UWB). The accuracy of the location data can be increased by sensor-fusion with one or more of the sensors embedded in one or more of the body-worn sensors mentioned in the last section.

Most existing indoor RTLS are not sufficiently precise for applications that need an accuracy at the level of less than a meter. They are based on different radio communication technologies such as UWB, RFID, Bluetooth, Ultrasound, Visible Light, infrared, SigFox, and long range (LoRA). Among these, ultrasound-based systems seem to be particularly promising since they are less affected by interference from metallic objects than electromagnetic methods. They are less influenced by opaque objects in the environment than optical technology while being cheaper to realize. An RTLS usually comprises of fixed units located at particular points in a closed room which receive wireless signals from tags or badges attached to persons or objects of interest. The units measure the arrival times of a signal which vary due to the different distances between the units and a tag transmitting the signal. From the travel time spread and the knowledge about the locations of the fixed units, the position of the signal transmitters can then be computed using triangulation.

A practical and efficient solution to locate a user in a confined area such as a retail store is to utilize the microphone of his/her smartphone as a localization tag. This is, for instance, done by the Forkbeard™ technology. It uses fixed units which are usually installed at the ceiling of a room and emit ultrasound signals in precisely coordinated intervals. The various signals are received by smartphones in the environment which measure the time lags between the signals. Further, the fixed units send their exact positions in the room such that the smartphone can triangulate its own position. This technology promises to reach a precision level of at least 10 cm. For retail stores, this precision is more than enough since a location accuracy of around 30 cm is sufficient to differentiate between different product-containing compartments in the store.

The user stop detection mechanism is realized as follows: An app in a customer's smartphone measures constantly its position using the RTLS. If the phone rests for a certain time in an area as discussed above, this is classified as a stop and the position is stored in a data base. In this way, all places at which the customer stops while shopping are retained. When the shopping activity is finished, the data set will be sent in anonymous form (to preserve the user's privacy) towards the server running the product locator.

Purchased Items List

The last piece of information needed from the user's traversal through the indoor environment is the items the user has picked up and bought. This information can be gained from any system, e.g., cashier systems in retail stores, which register the items bought/picked up by a user.

The second data set to be used by the product locator is the list of all items bought by the customer in the shopping environment. A way to achieve this is to let the customer's smartphone retrieve the list from the cash register used for paying. An alternative is to use special customer applications on a smartphone, for example. Lately, a trend among grocery stores has been to provide such applications giving additional digital experiences to their customers, e.g., systems providing bonuses, sales or discounts based on products purchased. These applications register which items each customer buys every time she/he visits the store. This information can be easily used to create the list of products purchased by a customer during a single store visit. Further, it is simple to combine this list with the set of stops also registered in the smartphone. From a judicial point of view, this solution is also helpful since customers who do not want their purchases being stored for inferring product locations, can simply switch of the tracking functionality or avoid using this app at all.

Before describing the product localization approach in detail, we give a short introduction to the various designators used in this section. We define a particular indoor Environment of interest as E. The space covered by E is restricted by artificial boundaries in which a finite set of positions and items can be found. The set of all unique Positions in E is described by the set P while I refers to all unique Items available in E. The positions of the various items in E are described by the Localization function $L:[I \rightarrow P]$ that maps each item to its actual position. L is not a one-to-one mapping such that a position p can be assigned to several items. Our approach accumulates the data of a large number of customers $C=\{c_1, c_2, \ldots\}$ moving in E over time. For a single customer $c \in C$, we define $P_c \subseteq P$ as the trajectory of positions, c passes while moving through E for shopping. The set $S_c \subseteq P_c$ is the set of positions at which the RTLS registers Stops for $_c$. Further, we define $I_c \subseteq I$ as the set of items purchased by customer c during a traversal through E. Based on that, we can now define for a customer c the pair of data sets $ds_c$ $[S_c, I_c]$ that will be utilized by the Product Locator.

In the following, the way the data sets $ds_c$ are analyzed and processed in order to obtain the localization mapping L for all items $i \in I$ in E. The inference algorithm consists of three steps:

1) Calculate the score for each customer $c \in C$ from her/his data set $ds_c=[S_c, I_c]$.
2) Accumulate the scores of all users in C and store the result in a data store.
3) Infer mapping $L:[I \rightarrow P]$ from the computation in step 2 by comparing for each item the scores that it is placed at a certain location, and return the position that has the highest score.

The three steps are described in greater detail below. Two extensions of the score accumulation step are also described. One is the leaky score accumulation algorithm that weights newer customer data higher than older. This makes the algorithm more flexible against moving certain items to other positions in a store. The second improvement of the score accumulation step is Softmax-based inference. It uses the Softmax function, which makes the inference of correct item-to-position mappings faster and more reliable.

To clarify the various aspects of our product locator algorithm, a simple scenario is used. In a grocery store, bread is at position p1, milk at p2, eggs at p3, and cheese at p4. Further, it is assumed that a user buying milk, bread, and eggs while a second one purchases only milk and a third one milk, bread, and cheese. For simplicity, it is assumed that all three customers stop at all the positions at which their purchased products are, and at no other positions.

Formalizing this information we get the sets $C=\{c1, c2, c3\}$, referring to the three customers, $I=\{i1(milk), i2(bread), i3(eggs), i4(cheese)\}$ describing four products, and $P=\{p1, p2, p3, p4\}$ representing the four positions of the products. The datasets for the three customers are defined as follows:

$dsc1=[\{p1, p2, p3\}, \{i1, i2, i3\}]$, $dsc2=[\{p2\}, \{i1\}]$, $dsc3=[\{p1, p2, p4\}, \{i1, i2, i4\}]$ The Basic Algorithm 1) User Score Calculation: In the first step, the data gathered for a customer is stored in the form of the data set $DS_C$. The set $DS_C$ is transformed into a matrix $M_c$ that contains a row for each item and a column for each position. Using m items and n positions, this matrix has then the size m×n. In $M_c$, all matrix elements are marked considering an item purchased by c and a position at which c stopped as 1 and else as 0. FIG. 2. depicts the matrices Mc1, Mc2 and Mc3 created from the datasets dsc1, dsc2 and dsc3.
2) Accumulation of Customer Scores: In this step, the customer matrices Mci are accumulated to a data store matrix DS which can be achieved by simple matrix addition.

An advantage of the algorithm is that not all customer scores have to be available when running it. Instead, DS can be calculated based just on the customer data currently available. When data from a new customer arrives, DS can be augmented by adding the corresponding customer score matrix to its previous version. Adding mc1, mc2 and mc3 together results in the matrix shown in FIG. 3.

3) Inference of the localization mapping: The final step of the algorithm is inferring the locations of the items in the indoor environment from the data in matrix DS. To achieve that, we attach to each item the position that according to DS has the highest value.

To prevent wrong localizations of items, we can further demand a certain minimum difference between the highest and second highest values (e.g., the difference between the highest and second highest value has to be at least 10% of the sum of all values in the corresponding row of DS).

Looking at our example data store DS, FIG. 3. one can only unambiguously infer that item $i_1$ is at position $p_2$ while the exact positions of the other items are not clear-cut after considering just three customers. The inferences would be getting unambiguous if some more customer results were considered.

Leaky Customer Score Accumulation

The goal of this optimization of the customer score accumulation is to reduce the bias, the system has for older data compared to newly collected customer scores. The data registered for a product in DS, i.e., the value of element for an item x at the position y, will become very large over time as more customers purchase the product, and to be able to do so, stop at its position. This can be seen as positive as long as the position of the product is never moved. If products, however, are regularly relocated (which happens often in grocery stores), the algorithm needs quite long until inferring the correct position again. The reason is that many customer scores considering the new location of the item have to be accumulated until those considering the old place are outpaced. The leaky customer score accumulation algorithm allows a mitigation of this problem.

One define the so-called leaky factor $\alpha$ with $0<\alpha<1$. When one now adds the score matrix Mc of a new customer c to the data store matrix DS, one reduces all the elements of DS referring to items bought by c and places that she/he did not visit.

The intuition for this improvement is that for all items purchased by c, the correct position for the items will most likely be among the positions at which the customer stopped. Based on this assumption, all matrix elements in DS that describe products in Ic, and positions not in Sc, are less likely to refer to correct product locations. Thus, it is useful to reduce the values of these matrix elements. If an item is now moved to another place, there will be several customers buying it but not stopping at its old location anymore. Thus, the value for the old position will decline relatively quickly such that it will be faster passed by the value for the new location of the product.

Finding the right balance between prioritizing new over old data was done by empirical experimentation. The value $\alpha=0.985$ achieved the best results in a set of tests.

The simulation of different values of $\alpha$ inspired a further improvement called the dynamic leaky score accumulation. Here we use a confidence level to indicate our trust in the data of a single customer c that is allocated her/his own leaky factor $\alpha c$. For instance, a customer buying one item and stopping at one location probably provides more accurate data than a customer stopping at 20 locations to buy a single product. Thus, the confidence level is based on two parameters, the number of items purchased, i.e., |Ic|, and the relation between the number of items purchased and number of stops performed by the customer, i.e., |Ic|. Simulation runs showed the alpha values in FIG. 4. to provide good results.

Thus, customers buying few products and stopping at most twice as often as the number of items purchased, are granted greater influence than other ones.

Softmax-Based Inference

The intuition behind the second improvement strategy for the score accumulation above is to amplify the differences between the values of the elements in data store DS. Moreover, one wants to consider the general numbers of stops at a certain position to evaluate the likelihood that a certain product resides there. Look for instance on the third row of the data store DS in the example. There, one has the value 1 in all of the first three columns such that one cannot claim a direct winner. On the other hand, the sums of the values in the first two columns of DS are much larger than the sum of the values in the third column. This indicates that fewer people not procuring item i3 stopped at position p3 than at p1 or p2 which makes it more likely that p3 is, indeed, the place where i3 is placed. The extension to the score accumulation algorithm presented here follows this consideration. It is based on the Softmax function and will be carried out in the following three steps, the resulting matrices from each step is shown in FIG. 5:

1) To amplify the more significant relations between items and positions, one transforms matrix DS to $DS^{exp}$ that uses exponential values. A problem to be solved is that the elements of DS may contain large numbers when the inputs of many users are stored such that computing the exponential value leads to an arithmetic overflow. To avoid that, one simply subtracts the value dsmax of the largest matrix element in DS from all elements. Thus, no element will have a value larger than 0 and arithmetic overflow is prevented.

The use of the exponential value makes it possible to get rid of the zeros in data store DS since a product might be located in a position not yet visited.

2) Thereafter, one perform the last step of the Softmax function by normalizing the rows of the exponential matrix $DS^{exp}$. This is done in order to find, for each product, the probability distribution based on the stops performed by customers buying this product. The matrix reached in this step is named $DS^{row}$.

3) Finally, one normalizes the columns of matrix $DS^{row}$ such that the sum of the values in each column is 1. The resulting Data Store is $DS^{sm}$.

Thus, one realizes the consideration discussed above, that a product is more likely at a position if relatively few people not buying it stopped there. Then one takes matrix $DS^{sm}$ instead of DS in the inference step described above.

Evaluation

Embodiments of the product localization approach were evaluated through simulating the data sets. The issue is that real data traces for the discussed shopping use case are not currently available. For that, the necessary RTLS hardware for high precision indoor location sensing must be provided, and the existing store applications on the smartphones of the customers have to be extended to provide the list of purchased items per shopping. To evaluate the core functionalities of our proposed solution, and to learn more about it in order to fine-tune it (e.g., selecting the correct leaky factor), hundreds of simulations of various shop environments were carried out. For that, a suitable tool was developed to simulate indoor environments and the required customer data. For simulation, data sets were considered with diverse distributions close to the reality in order to cover all different potential scenarios in real shopping scenarios. Therefore, these reported simulation results provide practical and relevant insights to embodiments of the product localization approach. The first subsection will describe the three modules the simulation tool is comprised of, in detail. Thereafter, the results of the evaluation runs are discussed.

Simulator

The simulation tool consists of a creator for the shop environment, a creator for customer behavioral inputs, and the simulator core.

The environment creator module creates models of an indoor environment E to be simulated. For typical grocery stores, 8,000 items offered at 800 positions are realistic values to be used. The difference between the two numbers results from the fact that many products are pooled in shelves. From these inputs, the environment creator builds the sets I and P as well as the data store matrix variable DS.

The second module of the simulation tool is the customer creator. It is used to simulate customers moving through the simulated environment and purchasing the offered items. For each simulated customer c, the customer creator generates a random data set. To simulate a realistic purchasing behavior, the customers buy products with vastly differing likelihoods. This reflects that some products like low-fat milk are bought much more often than others, for example, mustard with truffles. The number of items purchased by the customers to be in line with normal shopping behavior. To solve these two requirements without having access to real data of a retail store as a foundation for the simulations, the customer creator uses a truncated Gaussian distribution when selecting the number of items purchased by a customer. This distribution is also used to select with which likelihood the customers buy a certain item.

As discussed above, one has to face errors in the data sets since customers stop at positions without buying the goods available there, and they might pick certain products on the fly without the RTLS detecting any stop. To consider these errors in the simulations, the customer creator works as follows: When creating a new customer c, it first determines the number of items the customer purchases using the corresponding truncated Gaussian distribution. Thereafter it selects which items the customer buys using the other Gaussian distribution. This leads to the set Ic, followed by querying the environment creator for the correct locations of the selected items. Using these data directly as Sc would produce a "perfect" data set for the product locator, i.e., the customer would stop at exactly the positions at which the purchased products are located.

This perfect user set is then altered by an error function. At first, a random number of additional locations from the simulated environment is selected and added to set Sc. This function follows a certain distribution that can be parameterized prior to a simulation run. At second, to simulate the event that the RTLS misses stops at places at which items are picked, elements of Sc from the perfect data set are removed following also a parameterizable function.

The third module is the simulator core which is responsible for initiating both the environment creator and the customer creator. Further, this module realizes the product locator and feeds it with the data sets created by the customer creator. To give meaningful information about the accuracy of the product locator during the learning phase, i.e., its ability to predict the correct location for the products, the core module compares the produced function with the real positions in predefined intervals and stores this information.

Figure 6:
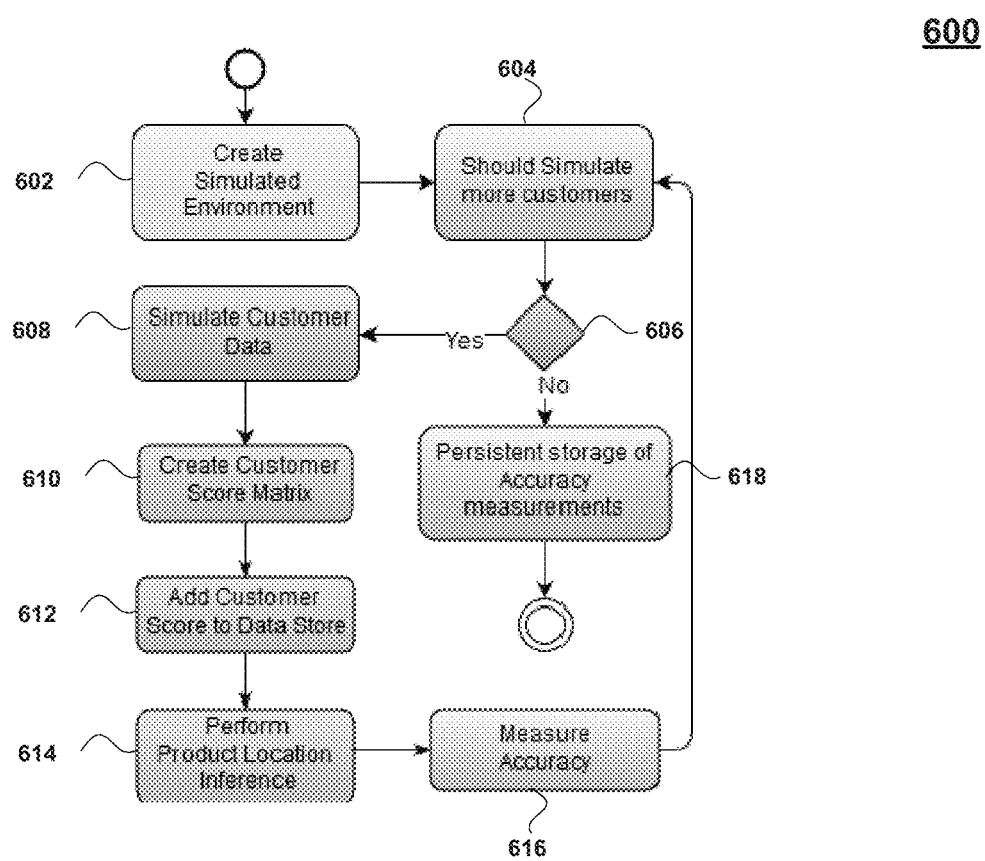
FIG. 6 illustrates an exemplary simulator algorithm, according to example aspects of the present disclosure.

The different steps performed during a simulation run 600 are depicted in FIG. 6. The simulation is started by the environment creator 602 building an indoor environment. If more customers shall be simulated 604, 606, the customer creator 608 creates a new data set that may contain errors followed by the three steps of the product locator. Step 610 create customer matrix, followed by step 612 that adds customer score to data score. Step 614 performs a product location inference. If the predefined interval is finished, moreover, the accuracy of the location mapping is checked 616 and stored.

When all desired customers are simulated, the simulator terminates by storing the accuracy measurements in a file 618.

Simulation Results

Embodiments of the product locator system was thoroughly tested through hundreds of simulation runs, wherein various store configurations were used to further analyze the system behavior in varying environments. To evaluate the quality of the solution, the accuracy metric acc is used.

1) Testing Embodiments of the Basic Product Locator System: First, the gradual increase in accuracy is shown using what we claim to be "realistic" parameters. A shopping environment was simulated with 8,000 items, 800 positions, and 35,000 customers. Besides stopping at the correct positions of the bought items, a customer makes additional "erroneous" stops with a likelihood pattern of 30/20/10. This means that the chance of adding 0 to 10 additional stops is double the likelihood of adding between 11 and 20 which is again double the chance that 21 to 30 additional stops are added. Within the intervals, a uniform distribution is assumed. Further, a probability of 10% is assumed that a stop at a correct position is not noted by the RTLS. With the simulation parameters described above, an accuracy of 99% is achieved after 8420 customers, 99.9% after 12170, and finally, all products were correctly located after 18630 customers.

2) Increased Error Rates: The second group of simulations intends to fathom the robustness of embodiments of the product location algorithm by vastly increasing the likelihoods of additional stops and not detected pickings of products. The product locator still locates all items in the simulated environment, albeit with a slightly greater delay.

3) Handling Relocated Products: The third group of simulations considers the behavior of our algorithm when products are relocated. These simulations show that the dynamic leaky accumulation has a clear advantage against the simple leaky accumulation and even more against the simple algorithm when there is significant relocation of items during the lifetime of the product locator.

4) Comparing the Score Accumulation Variants: Finally, we compare the customer score accumulation of the basic variant with the Dynamic Leaky Customer Score Accumulation, and the Softmax-based Inference for the "realistic" shop scenario without product relocations.

The simulations reveal that the differences between the four scenarios are minimal, in simulations where realistic values were used. Just with relatively few customer data sets, the Softmax-based extension gives a better accuracy score which becomes nearly irrecognizable when the data sets of more than 15,000 customers are considered. On the other hand, Softmax-based Inference has an advantage for localizing items that are rarely purchased. Thus, if a store has a fair number of such items, Softmax-based inference is more efficient than the basic algorithm.

Figure 7:
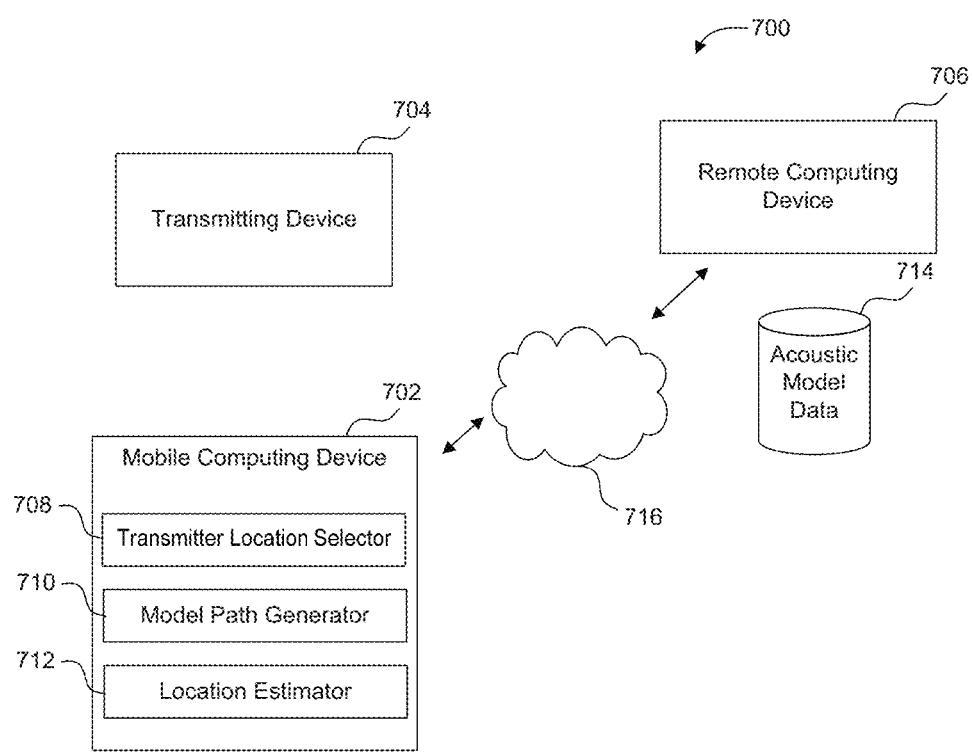
FIG. 7 depicts an example real-time locating system according to example aspects of the present disclosure.

FIG. 7 depicts an example real-time locating system 700 according to example aspects of the present disclosure. The system 700 includes a mobile computing device 702, a transmitting device 704, and a remote computing device 706. In various implementations, the system 700 may include one or more transmitting devices deployed throughout an environment (e.g. campus, building, room, area, etc.) in such a manner as to facilitate a location determination of one or more mobile computing devices located within the environment. The transmitting devices may be deployed in various suitable arrangements or configurations throughout the environment based on the needs or desires of the user.

The mobile computing device 702 may be configured to receive acoustic signals from the transmitting device 704 when located within a broadcast range of the transmitting device 704. In this manner, the transmitting device 704 may be configured to, at various intervals, (e.g. periodically), transmit acoustic (e.g. ultrasonic) signals that may be received by one or more mobile computing devices (e.g. mobile computing device 702), and used for determining the location of these mobile computing devices.

The mobile computing device 702 includes a transmitter location selector 708, a model path generator 710, and a location estimator 712. The transmitter location selector 708 may be configured to select one or more sets of peaks from a time domain representation of the magnitude of the received acoustic signals. More particularly, the transmitter location selector 708 may be configured to select a set of peaks based at least in part on the amplitude of the peaks and/or an order of arrival of the peaks. For instance, the transmitter location selector 708 may select a set of two peaks, wherein the selected peaks include the first two peaks received by the mobile computing device 702 that have an amplitude above a threshold. In some implementations, the transmitter location selector 708 may select a set of more than two peaks. The selected peaks may represent received acoustic signals from the transmitting device 704. In particular, the peaks may represent acoustic signals that propagate to the mobile computing device 702 either directly or after having been reflected by one or more reflective surface in the environment in which the transmitting device 704 and the mobile computing device 702 are located.

The transmitter location selector 708 may further assign respective transmitter locations to the peaks. In particular, the transmitter location selector 708 may access acoustic model data 714 to assign the transmitter locations. The acoustic model data 714 may be stored, for instance, at a remote computing device, such as a server device. The remote computing device 704 may provide the acoustic model data to the mobile computing device 702, for instance, through communication via a network 716. The acoustic model data 714 may model acoustic properties of environments (e.g. one or more rooms, areas, spaces, etc.) associated with the real-time locating system 700. In particular, the acoustic model data 714 may specify a plurality of transmitter locations associated with the transmitting device 704. The transmitter locations may correspond to the location of the transmitting device 704 (e.g. the physical transmitting device), and to the locations of a plurality of virtual transmitting devices with respect to one or more reflective surfaces within the environment. As indicated, the virtual transmitting devices may represent reflection points within the environment wherein the acoustic signals propagate from the transmitting device and are reflected by the one or more reflective surfaces. In this manner, the transmitter locations associated with the virtual transmitting devices may include locations on the reflective surfaces at which the acoustic signals are reflected.

Figure 8:
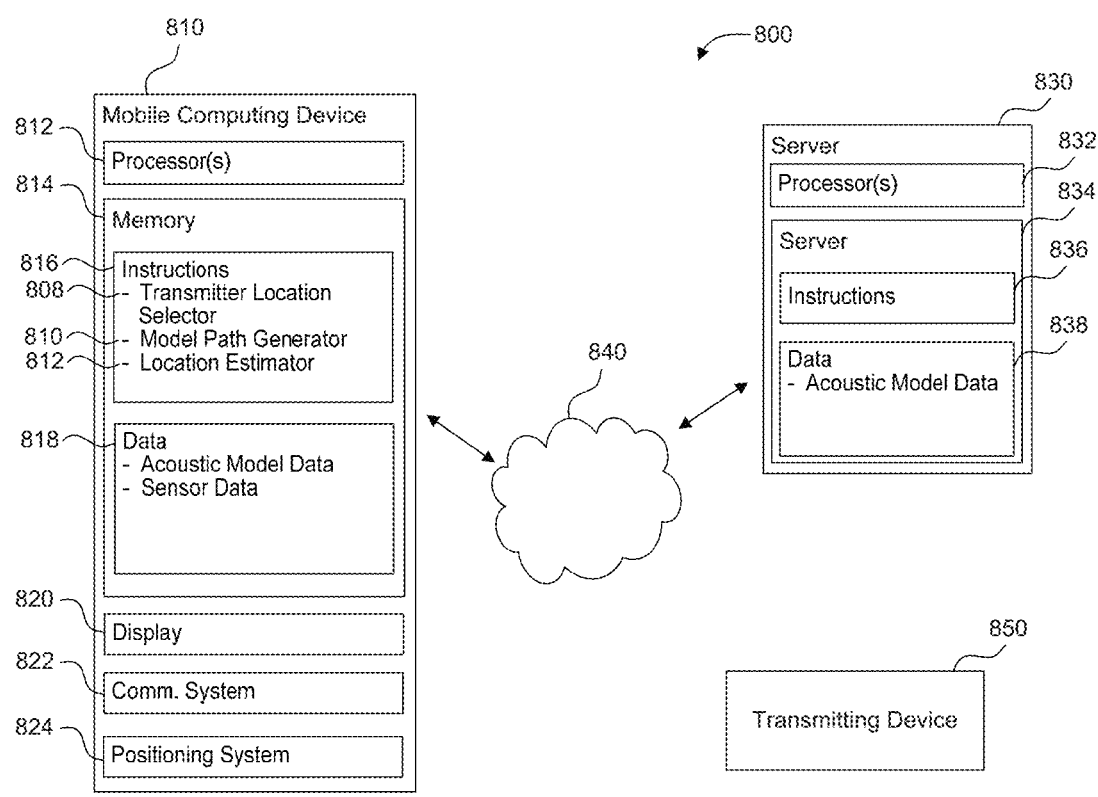
FIG. 8 depicts an example computing system according to example aspects of the present disclosure.

FIG. 8 depicts an example system 800 that can be used to implement the methods and systems of the present disclosure. In some implementations, the system 800 can be at least a portion of a real-time locating system configured to determine the locations of various suitable mobile computing devices. The system 800 can be implemented using a client-server architecture that includes a mobile computing device 810 that communicates with one or more remote computing devices, such as server 830. The system 800 can be implemented using other suitable architectures.

As shown, the system 800 can include a mobile computing device 810. The mobile computing device 810 can be any suitable type of mobile computing device, such as a smartphone, tablet, cellular telephone, wearable computing device, or any other suitable mobile computing device capable of being used in mobile operation. In some implementations, the mobile computing device can be a dedicated tag (e.g. passive or active) or other device for use in the real-time locating system. The mobile computing device 810 can include one or more processor(s) 812 and one or more memory devices 814.

The one or more processor(s) 812 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices, such as a system on a chip (SoC) or a SoC with an integrated RF transceiver. The one or more memory devices 814 can include one or more computer-readable media, including, but not limited to, non-transitory computer-readable media, RAM, ROM, hard drives, flash memory, or other memory devices.

The one or more memory devices 814 can store information accessible by the one or more processors 812, including instructions 816 that can be executed by the one or more processors 812. For instance, the memory devices 814 can store the instructions 816 for implementing one or more modules configured to implement, in certain embodiments, a transmitter location selector, a model path generator, and/or a location estimator, and/or other suitable instructions.

Each of the transmitter location selector, model path generator, and location estimator can include computer logic utilized to provide desired functionality. Thus, each of the transmitter location selector, model path generator, and location estimator can be implemented in hardware, application specific circuits, firmware and/or software controlling a general purpose processor. In one embodiment, each of the transmitter location selector, model path generator, and location estimator are program code files stored on the storage device, loaded into memory and executed by a processor, or can be provided from computer program products, for example computer executable instructions, that are stored in a tangible computer-readable storage medium such as RAM, hard disk or optical or magnetic media. The transmitter location selector, model path generator, and location estimator can each correspond to one or more different programs, files, circuits, or sets of instructions. Likewise, two or more of the transmitter location selector, model path generator, and location estimator can be combined into a single program, file, circuit, or set of instructions.

The instructions 816 can further include instructions for implementing a browser, for running a specialized application, or for performing other functions on the mobile computing device 810. For instance, the specialized application can be used to exchange data with server 830 over the network 840. The instructions 816 can include client-device-readable code for providing and implementing aspects of the present disclosure. For example, the instructions 816 can include instructions for implementing an application associated with the real-time locating system, or a third party application implementing wayfinding, asset tracking, or other services on the mobile computing device 810.

The one or more memory devices 814 can also include data 818 that can be retrieved, manipulated, created, or stored by the one or more processors 812. The data 818 can include, for instance, acoustic model data, sensor data, and/or other data.

The mobile computing device 810 can include various input/output devices for providing and receiving information from a user, such as a touch screen, touch pad, data entry keys, speakers, and/or a microphone suitable for voice recognition. For instance, the mobile computing device 810 can have a display 820 for presenting a user interface to a user.

The mobile computing device 810 can further include a positioning system 824. The positioning system 824 can be any device or circuitry for determining the position of remote computing device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system (e.g. using positioning sensors, such as an inertial measurement unit), a dead reckoning system, based on IP address, by using triangulation and/or proximity to cellular towers, Bluetooth hotspots, BLE beacons, Wi-Fi access points or Wi-Fi hotspots, Wi-Fi time-of-flight, and/or other suitable techniques for determining position.

The mobile computing device 810 can also include a network interface used to communicate with one or more remote computing devices (e.g. server 830) over a network 840. The network interface can include any suitable components for interfacing with one more networks, including for example, transmitters, receivers, ports, controllers, antennas, or other suitable components.

The mobile computing device 810 can further include a communication system used to communicate with one or more transmitting devices, such as transmitting device 850. The communication system can include, for instance, one or more transducers (e.g. microphone devices) configured to receive acoustic (e.g. ultrasonic) signals from the transmitting device 850.

In some implementations, the mobile computing device 810 can be in communication with a remote computing device, such as a server 830 over network 840. Server 830 can include one or more computing devices. The server 830 can include one or more computing devices, and can be implemented, for instance, as a parallel or distributed computing system. In particular, multiple computing devices can act together as a single server 830.

Similar to the mobile computing device 810, the server 830 can include one or more processor(s) 832 and a memory 834. The one or more processor(s) 832 can include one or more central processing units (CPUs), and/or other processing devices. The memory 834 can include one or more computer-readable media and can store information accessible by the one or more processors 832, including instructions 836 that can be executed by the one or more processors 832, and data 838. For instance, although the transmitter location selector, model path generator, and location estimator are depicted in FIG. 8 as being included in the mobile computing device 810, in other implementations, one or more of the transmitter location selector, model path generator, location estimator, and other functionalities can be included in the server 830.

The data 838 can be stored in one or more databases. The data can include acoustic model data and other data. The one or more databases can be connected to the server 830 by a high bandwidth LAN or WAN, or can also be connected to server 830 through network 840. The one or more databases can be split up so that they are located in multiple locales.

Server 830 can also include a network interface used to communicate with computing device 810 over network 840. The network interface can include any suitable components for interfacing with one more networks, including for example, transmitters, receivers, ports, controllers, antennas, or other suitable components.

Network 840 can be any type of communications network, such as a local area network (e.g. intranet), wide area network (e.g. Internet), cellular network, or some combination thereof. Network 840 can also include a direct connection between the mobile computing device 810 and server 830. Network 840 can include any number of wired or wireless links and can be carried out using any suitable communication protocol.

The system 800 can further include one or more transmitting devices, such as transmitting device 850. The transmitting device 850 can transmit acoustic signals (e.g. ultrasonic signals) such as described with regard to transmitting device. In some implementations, the transmitting device 850 can transmit other suitable signals, such as radio frequency signals. The transmitting device 850 can be implemented using any suitable computing device(s). The transmitting device 850 can include one or more transducers configured to emit acoustic or other suitable signals that can be used by the mobile computing device 810 to facilitate a location estimation of the mobile computing device 810 according to example aspects of the present disclosure. Although only one transmitting device is depicted in FIG. 8, it will be appreciated by those skilled in the art that any suitable number of transmitting devices can be included in the system 800.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of product localization comprising:
   detecting, using a real-time location system (RTLS), one or more stoppage locations each user of a plurality of users makes in an indoor environment, wherein detecting the one or more stoppage locations includes using the RTLS that is an electromagnetic technology-based system;

determining, by the RTLS, whether each user stays within a small area relative to the indoor environment for a predetermined amount of time;

receiving a list of one or more purchased items purchased by each user of the plurality of users in the indoor environment, the list being provided by a purchasing system associated with the indoor environment;

correlating at least one of the one or more purchased items with at least one of the one or more stoppage locations, wherein the correlating includes populating a two-dimensional item-stop array for each user of the plurality of users, wherein one dimension of the two-dimensional item-stop array represents purchased items and the other dimension of the two-dimensional item-stop array represents the one or more stoppage locations; and predicting a location of the one or more purchased items based on the correlating, wherein the predicting further includes accumulating respective two-dimensional item-stop arrays for respective multiple users to form an accumulated two-dimensional item-stop array, wherein the accumulating includes matrix addition of the respective two-dimensional item-stop arrays, and the predicting is based on the location having a highest score in the accumulated two-dimensional item-stop array for the respective one or more purchased items.

2. The computer-implemented method of claim 1, wherein the detecting the one or more stoppage locations includes using the RTLS that is also an ultrasound-based system.

3. The computer-implemented method of claim 1, wherein the detecting the one or more stoppage locations includes using the RTLS that is also an infrared-based system.

4. The computer-implemented method of claim 1, wherein the small area relative to the indoor environment is an area of one meter diameter and the predetermined amount of time is at least three seconds.

5. The computer-implemented method of claim 1, wherein the detecting the one or more stoppage locations includes using a human activity classifying algorithm in conjunction with the RTLS.

6. The computer-implemented method of claim 1, wherein the receiving the list of one or more purchased items includes receiving the list via a user application on a smartphone.

7. The computer-implemented method of claim 1, wherein a non-zero entry of the two-dimensional item-stop array is indicative that the user purchased the respective purchased item and the user stopped at the respective stoppage location.

8. The computer-implemented method of claim 1, wherein the predicting the location further includes:
using a leaky customer score accumulation algorithm.

9. The computer-implemented method of claim 1, wherein the predicting the location further includes:
using a softmax-inference based algorithm.

10. A product localization system comprising at least one processor, the at least one processor configured to:
identify, using a real-time location system (RTLS), one or more stoppage locations made by each user of a plurality of users in an indoor environment, wherein identifying the one or more stoppage locations includes using the RTLS that is an electromagnetic technology-based system;

determine, by the RTLS, whether each user stays within a small area relative to the indoor environment for a predetermined amount of time;

receive a list of one or more purchased items purchased by each user of the plurality of users in the indoor environment, the list being provided by a purchasing system associated with the indoor environment;

correlate at least one of the one or more purchased items with at least one of the one or more stoppage locations, wherein the correlating includes populating a two-dimensional item-stop array for each user of the plurality of users, wherein one dimension of the two-dimensional item-stop array represents purchased items and the other dimension of the two-dimensional item-stop array represents the one or more stoppage locations; and predict a location of the one or more purchased items based on the correlating, wherein the predicting further includes accumulating respective two-dimensional item-stop arrays for respective multiple users to form an accumulated two-dimensional item-stop array, wherein the accumulating includes matrix addition of the respective two-dimensional item-stop arrays, and the predicting is based on the location having a highest score in the accumulated two-dimensional item-stop array for the respective one or more purchased items.

11. The system of claim 10, wherein the at least one processor is further configured to identify the one or more stoppage locations by using the RTLS that is also an ultrasound-based system.

12. The system of claim 10, wherein the at least one processor is further configured to identify the one or more stoppage locations by using the RTLS that is also an infrared-based system.

13. The system of claim 10, wherein the small area relative to the indoor environment is an area of one meter diameter and the predetermined amount of time is at least three seconds.

14. The system of claim 10, wherein the at least one processor is further configured to identify the one or more stoppage locations by using a human activity classifying algorithm in conjunction with the RTLS.

15. The system of claim 10, wherein a non-zero entry of the two-dimensional item-stop array is indicative that the user purchased the respective purchased item and the user stopped at the respective stoppage location.

16. The system of claim 10, wherein the at least one processor is further configured to predict the location by:
using a leaky customer score accumulation algorithm.

17. The system of claim 10, wherein the at least one processor is further configured to predict the location by:
using a dynamic leaky customer score accumulation algorithm.

18. The system of claim 10, wherein the at least one processor is further configured to predict the location by:
using a softmax-inference based algorithm.

* * * * *